United States Patent [19]

Hosoi

[11] Patent Number: 5,025,311
[45] Date of Patent: Jun. 18, 1991

[54] VIDEO SIGNAL SEPARATING APPARATUS

[75] Inventor: Osamu Hosoi, Neyagawa, Japan

[73] Assignee: Matsushita Electric Industrial Co., Ltd., Osaka, Japan

[21] Appl. No.: 288,479

[22] Filed: Dec. 22, 1988

[30] Foreign Application Priority Data

Dec. 28, 1987 [JP] Japan .................. 62-331957
Feb. 5, 1988 [JP] Japan .................. 63-26102

[51] Int. Cl.$^5$ .............................................. H04N 9/78
[52] U.S. Cl. ........................................ 358/31; 358/36; 358/314
[58] Field of Search .................. 358/31, 36, 314

[56] References Cited

U.S. PATENT DOCUMENTS 4,178,609 12/1979 Buetel .
4,734,758 3/1988 Honjo ................................ 358/31
4,809,060 2/1989 Saeki ................................. 358/31
4,814,863 3/1989 Topper et al. .................... 358/31
4,922,331 5/1990 Ezaki ................................. 358/31

FOREIGN PATENT DOCUMENTS 58-111596 7/1983 Japan .
61-290892 12/1986 Japan .
62-152290 7/1987 Japan .

Primary Examiner—Howard W. Britton
Assistant Examiner—Michael H. Lee
Attorney, Agent, or Firm—Stevens, Davis, Miller & Mosher

[57] ABSTRACT

A Y/C separating apparatus used in video tape recorders, etc., and capable of performing correct adaptive Y/C separation without increasing the circuit scale substantially. The process includes the steps of converting an analog video signal to a digital video signal, converting the relation between the digital video signal and a delayed version of the digital signal into a data signal, delaying this data signal, and analyzing the relationship between the signals inclusive of the delayed data signal. Thus it is possible to perform an accurate adaptive Y/C separation without increasing the memory capacity substantially.

7 Claims, 18 Drawing Sheets

F I G. 9
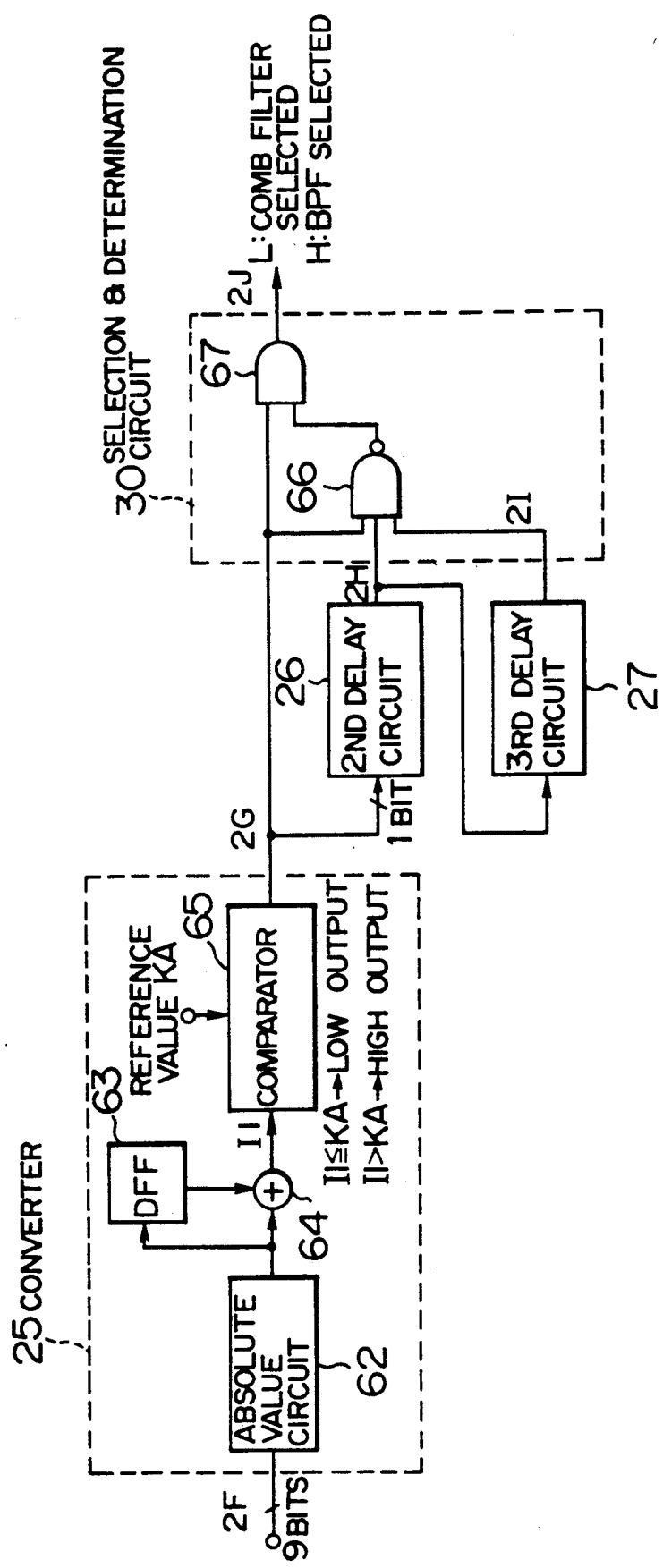

VIDEO SIGNAL SEPARATING APPARATUS

BACKGROUND OF THE INVENTION

The present invention relates to video signal separating apparatus which are used in video tape recorders, etc., to separate a luminance signal and a color signal from a video signal.

Recently, demand for civilian video tape recorders having high image quality has been increasing, and S-VHS and ED beta recorders are widely used throughout the world which provide high Y (luminance) signal resolution and Y signal/C (color) signal separate input and output. Y/C separating devices which separate Y and C signals from a composite signal increase their importance. For separation of Y/C signals, a comb filter is used on the presumption that no signal changes occur between raster lines. If a signal is changing between lines, a band-pass filter is merely used because the signal may be subjected to dot disturbance or color down-shift causing color spread/blot at color contour on display screen. Therefore, in order to separate the Y and C signals from each other accurately, it is required to detect whether the signal is changing between lines.

One example of the above conventional Y/C separating apparatus will now be described with reference to the drawings.

FIG. 1 shows a conventional Y/C separating apparatus. In FIG. 1, reference numeral 12 denotes a band-pass filter for passing a color signal band; 13, a delay circuit which provides a delay of one horizontal period (1H) for an NTSC signal and a delay of 2H for a PAL signal; 14, an arithmetic operation circuit comprising an adder; 15, a selector; 16, a subtractor; 17, a multiplier having a multiplying factor of ½; 18, a switching circuit; and 19, a subtractor.

The operation of such a Y/C separating apparatus will now be described with reference to FIG. 1. Assume that the input signal is an NTSC signal and that the delay circuit 13 provides a delay of 1H for the input signal.

The band pass filter (BPF) 12 separates a color signal component from an input video signal 7A and outputs it as a signal 7B, which is then delayed by the delay circuit 13. The signal 7B and a signal 7C, comprising a delayed version of the signal 7B, from the delay circuit 13 are added by the adder 14. The subtractor 16 subtracts the signal 7C from the signal 7B, and the multiplier 17 multiplies the output from the subtractor 16 by a factor of ½ and outputs the result as a signal 7F constituting a color output signal from the comb filter. The output signal 7D from the adder 14 is inputted to the selector 15. If the amplitude level of the input signal is smaller than a predetermined value, the selector 15 determines that there is no change or correlation between the signals 7B and 7C and thus the output 7C from the switching circuit 18 becomes the output 7F from the multiplier 17 which comprises a color signal output. If the amplitude level of the signal input to the selector 15 is higher than the predetermined value, the selector determines that there is a change or correlation between the signals 7B and 7C, so that the output 7G from the switching circuit 18 assumes the signal 7B as the color signal. The subtractor 19 subtracts the color signal 7G from the video signal 7A and outputs the result as a luminance signal.

FIGS. 2 and 3 show the waveforms of the input and output signals related to the respective blocks of FIG. 1.

FIG. 2 shows the waveforms of the signals in phase with the burst signal and bearing a color component and those which change their states bearing no color components. The waveforms 7a-7g shown below the corresponding waveforms 7A-7G represent the phase differences of starting portions of the respective bursts and signal components relative to the initial 1H of the waveform 7A which is a reference phase. For an NTSC signal, the phase of each burst signal is inverted at intervals of 1H. The signal portions bear a given color, so that the phases of the signal portions are inverted at intervals of 1H. With such signals, the signal 7B is opposite in phase to the signal 7C which has passed the delay circuit 13 during the time interval in which the signals bear a given color, so that the sum of these signals produces a zero level forming a signal 7D. Since the amplitude level of the signal 7D is lower than a predetermined reference level at the selector 15, so that the output signal 7E is caused to select the comb filter output 7F. During time interval $t_1-t_2$ in which a signal bearing the given color changes to a signal bearing no color, and when the amplitude level of signal 7D is higher than the predetermined level, the output signal 7E is used to the output from the BPF 12. This avoids color spread/blot at color contour on display screen which would otherwise occur when the output from the comb filter is solely employed.

However, as shown in FIG. 3, if a signal component of a high frequency region of the Y signal is inputted to the apparatus such as causing vertical stripe on the display screen, the signals 7B and 7C are in phase, so that the signal 7D comprising the sum of these signals has twice the amplitude of the signal 7B. Therefore, the amplitude level of the signal 7D exceeds a predetermined reference level, so that the selector 15 determines that there is a change or no correlation between the signals 7B and 7C at the high frequency region signal of the Y signal, and the output signal 7E from the selector serves to select the output from the BPF 12 at the switching circuit 18. Therefore, the high frequency components of the Y signal become a chromatic output 7G which would cause cross color noise undesirably. It is possible to increase the number of circuit elements for determining whether there is a signal change between different lines by increasing a quantity of delay provided by the delay circuit 13 and checking the relation between the different lines, but there would arise a problem of cost increase. There is a similar problem when the separation between Y and C signals is performed digitally.

PAL signal is different from NTSC signal in that the phase of the burst signal becomes inverted at intervals of 2H, so that a quantity of delay provided by the delay circuit 13 is 2H. With the arrangement of FIG. 1, it is possible to avoid such a color deterioration with PAL signal as with NTSC signal, but there is the problem that cross color noise arises due to high frequency components of the Y signal.

SUMMARY OF THE INVENTION

It is an object of the present invention to perform an accurate adaptive Y/C separation without increasing the circuit scale substantially.

It is a specific object of the present invention to perform an accurate adaptive Y/C separation by converting a video signal to a digital signal, providing a correlation data signal indicative of the relative relation between the digital signal and a delayed digital signal, delaying the correlation data signal, and analyzing changes among those signals, inclusive of the delayed correlation data signal, without increasing the capacity of a memory used in the delay circuit significantly.

BRIEF DESCRIPTION OF THE DRAWINGS

FIG. 9 is a circuit diagram of the essential portion of the apparatus of FIG. 8;

DESCRIPTION OF THE PREFERRED EMBODIMENTS

Figure 1:
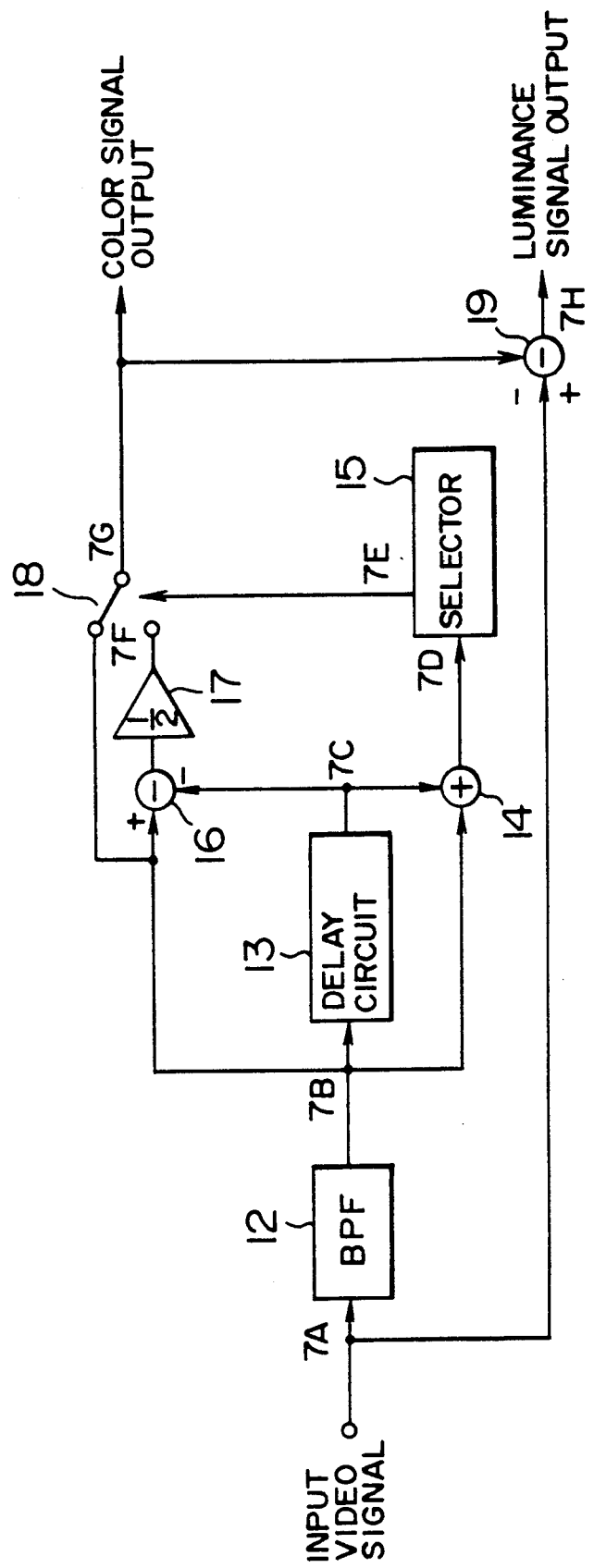
FIG. 1 is a block diagram of a conventional Y/C separating apparatus.
Figure 2:
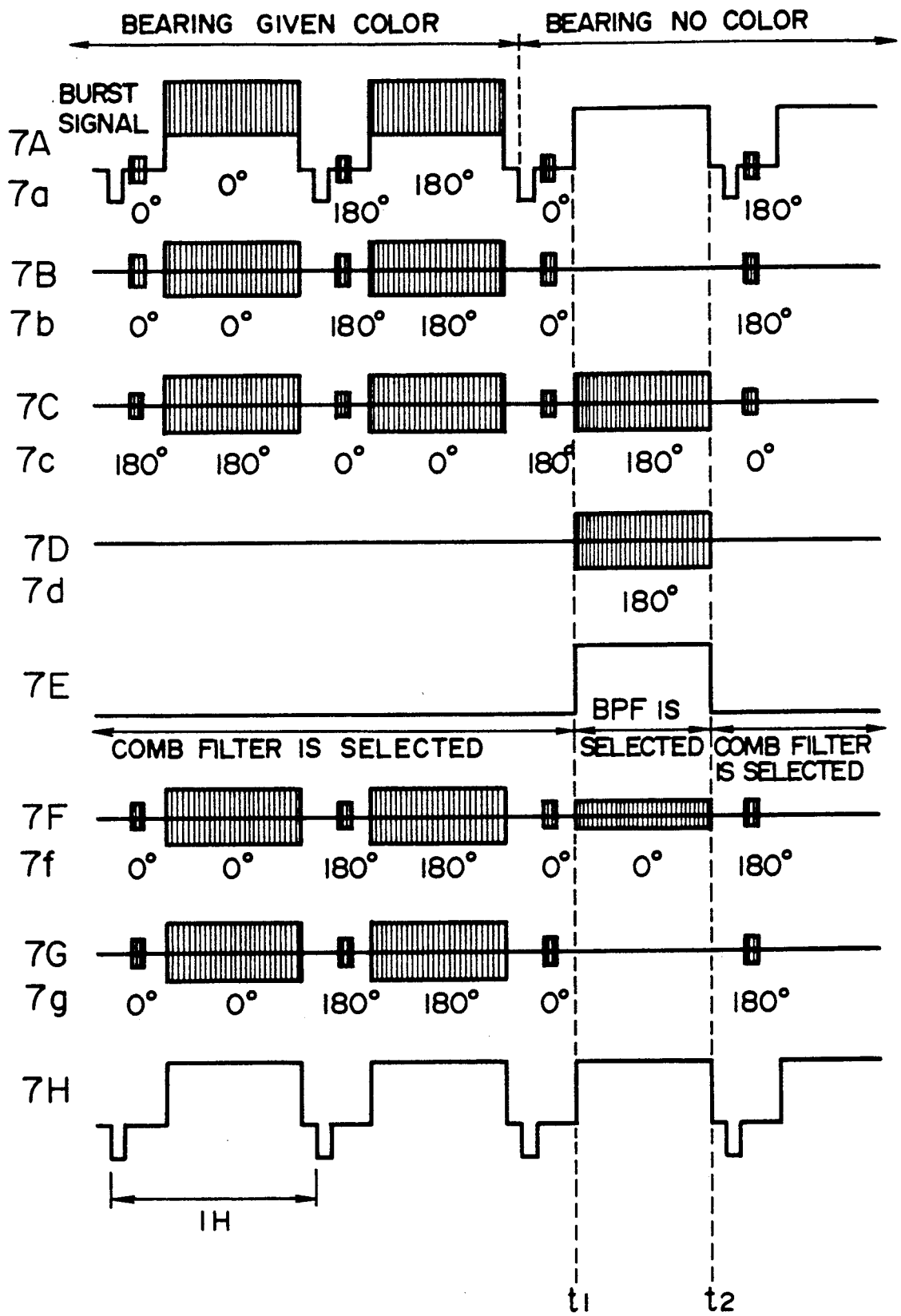
FIGS. 2 and 3 show waveforms of input and output signals related to the respective blocks of FIG. 1.
Figure 3:
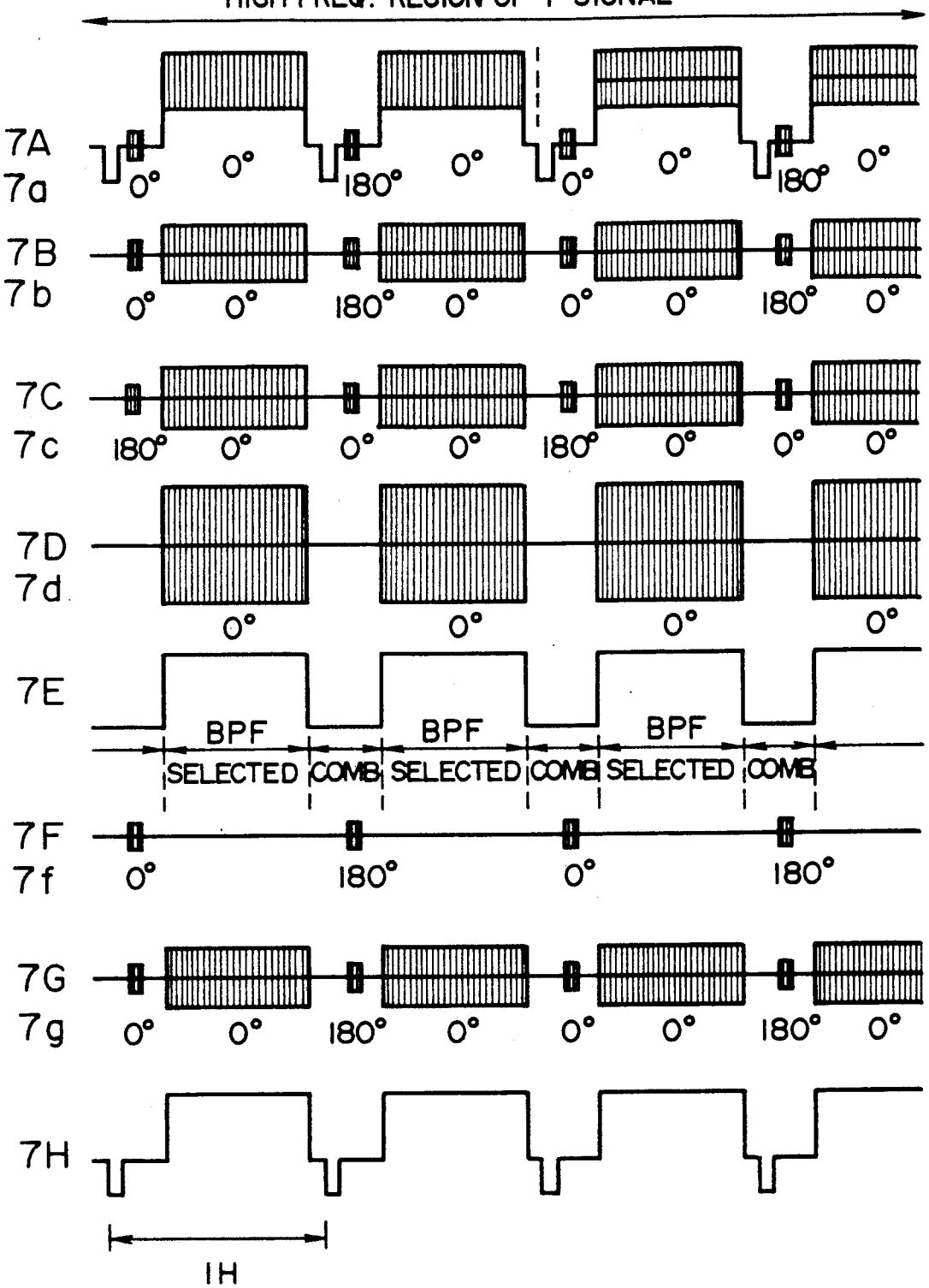
Figure 4:
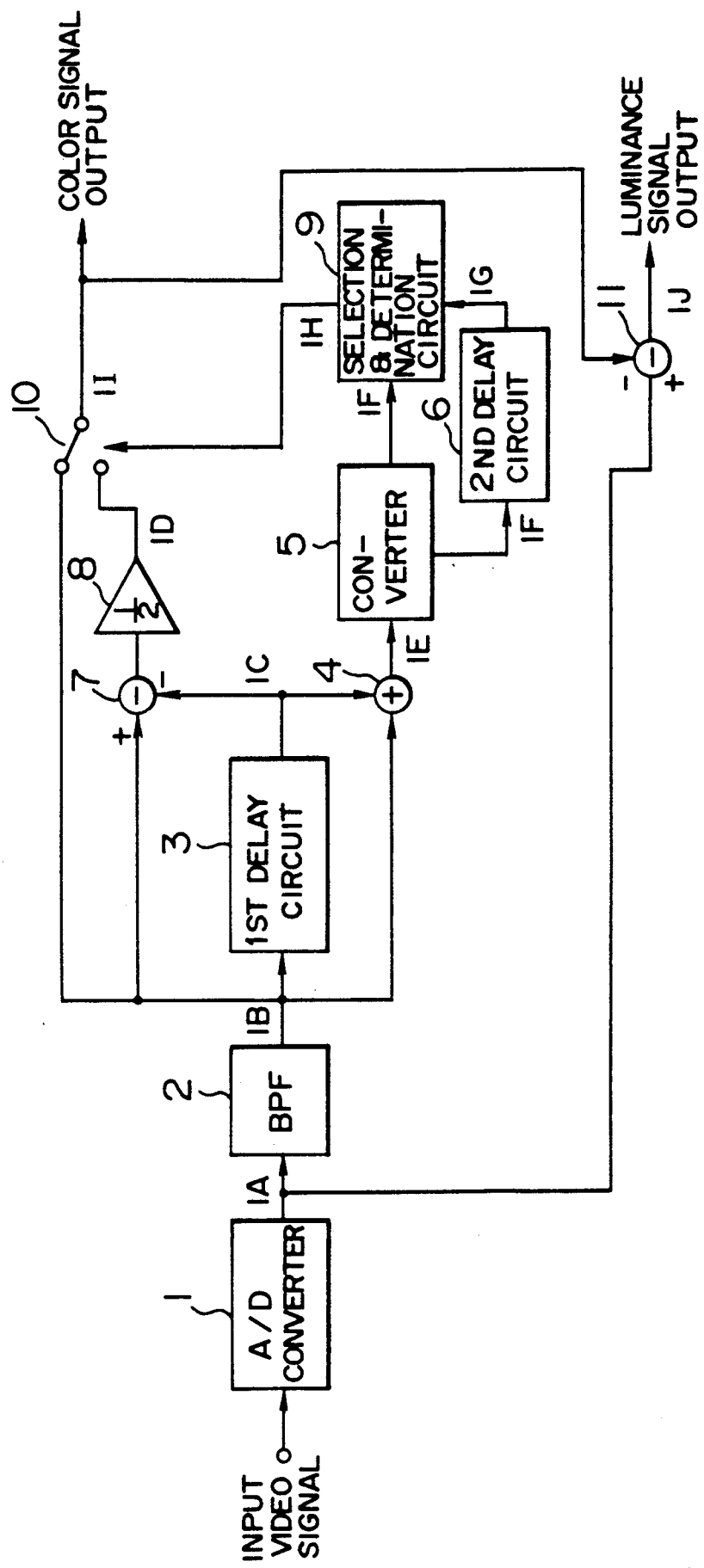
FIG. 4 is a block diagram of a Y/C separating apparatus as a first embodiment of the present invention.

A Y/C separating apparatus for an NTSC signal as a first embodiment of the present invention will now be described with reference to the drawings. Especially in FIG. 4 showing a block diagram, reference numeral 1 denotes an analog-to-digital (A/D) converter; 2, a bandpass filter (BPF); 3, a first delay circuit which provides a delay of 1H; 4, an adder; 5, a converter; 6, a second delay circuit which provides a delay of 1H; 7, a subtractor; 8, a multiplier; 9, a selection and determination circuit; 10, a switching circuit; and 11, a subtractor.

The operation of such Y/C separating apparatus will now be described with reference to FIG. 4. An input video signal is converted to a digital signal 1A by the A/D converter 1. The BPF 2 receives the digital video signal 1A and outputs a color band component signal 1B to the first delay circuit 3. The subtractor 7 subtracts the output 1C from the first delay circuit 3 from the output 1B of the BPF 2. The output from the subtractor 7 is multiplied by a factor of ½ to become a comb filter component 1D. The outputs 1B and 1C from the BPF 2 and the first delay circuit 3 are added by the adder 4 to become an output signal 1E, which is then converted by the converter 5 to a signal 1F, or two kinds of data segments, indicative of the correlation between the signal 1B and 1C (states L and H).

Figure 5:
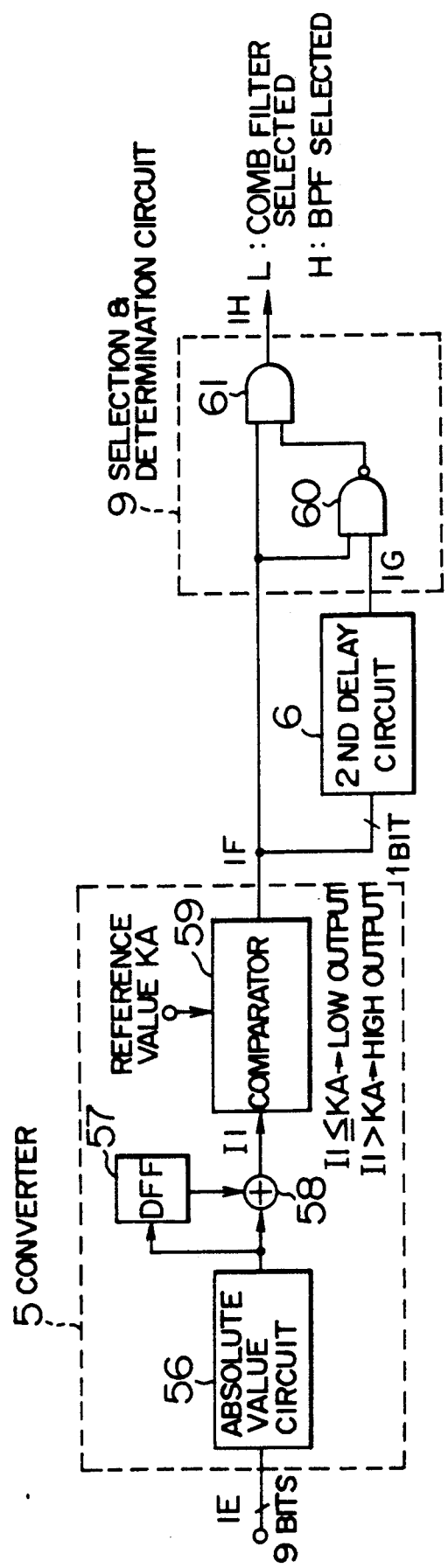
FIG. 5 is a circuit diagram of the essential portion of the apparatus of FIG. 4.

FIG. 5 shows the internal arrangement of the converter 5. Namely, it includes an absolute value circuit 56, a one-clock delay circuit 57, an adder 58, and a comparator 59. The output 1E from the adder 4 is changed by the absolute value 56 to an absolute value. The output from the absolute value circuit 56 and a one-clock delayed version of the output from the absolute value circuit 56 are added by the adder 58 to become an averaged absolute amplitude value I1, which is then compared with a predetermined reference value KA by the comparator 59. If the magnitude of the signal I1 is less than the reference value KA, the output from the comparator 59 becomes low while if the magnitude of the signal I1 is greater than the reference value KA, the output from the comparator 59 become high. The output from the comparator 59 is used as the output 1F from the converter 5, which is then input to the second delay circuit 6 to thereby be delayed by 1H.

The outputs 1F and 1G from the converter 5 and second delay circuit 6 are inputted to the selection and determination circuit 9, which determines which of the comb filter output and the BPF output should be outputted as the color signal. The selection and determination circuit 9 shown in FIG. 5 includes an NAND gate 60 and an AND gate 61. If the output 1F from the converter 5 is low, namely, if the change between signals 1B and 1C is small, the circuit 9 determines that no signal change is caused between the signals 1B and 1C and outputs the output 1D from the multiplier 8, namely, comb filter output 1D, as a color signal. If the output 1F from the converter 5 is high (large change is caused between the signals 1B and 1C) and the output 1G from the second delay circuit 6 is high (large change caused between signals 1B and 1C preceding by 1H), the circuit 9 determines that components of high frequency region of the Y signal are contained and outputs the comb filter output 1D as the color signal. If the output 1F from the converter 5 is high (the change between signals 1B and 1C is large), and the output 1G from the second delay circuit 6 is low (the change between signals 1B and 1C preceding by 1H is large), the circuit 9 determines that components of high-frequency region of the Y signal are contained and provides the comb filter output 1D as the color signal. If the output 1F from the converter 5 is high (the change between 1B and 1C is large) and the output 1G from the second delay circuit 6 is high (the change between signals 1B and 1C preceding 1G by 1H is small), the selection and determination circuit 9 determines that there is a change between the output signals 1B and 1C from the BPF 2 and the first delay circuit 3 and provides the output 1B from the BPF 2 as the color signal. The luminance signal is obtained by subtracting the color signal from the video signal in the subtractor 11.

Figure 6:
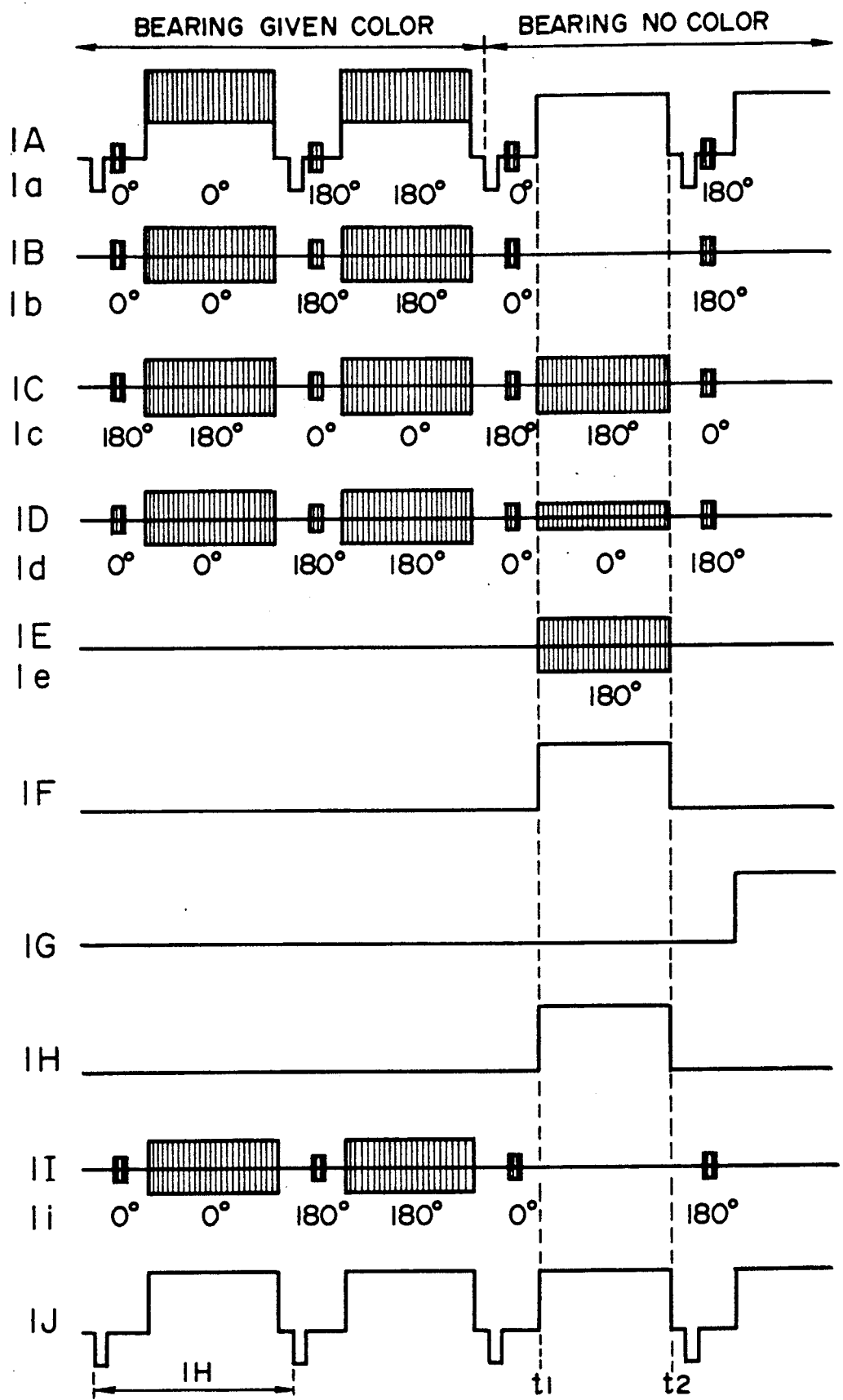
FIGS. 6 and 7 show waveforms of input and output signals related to the respective blocks of FIG. 4.
Figure 7:
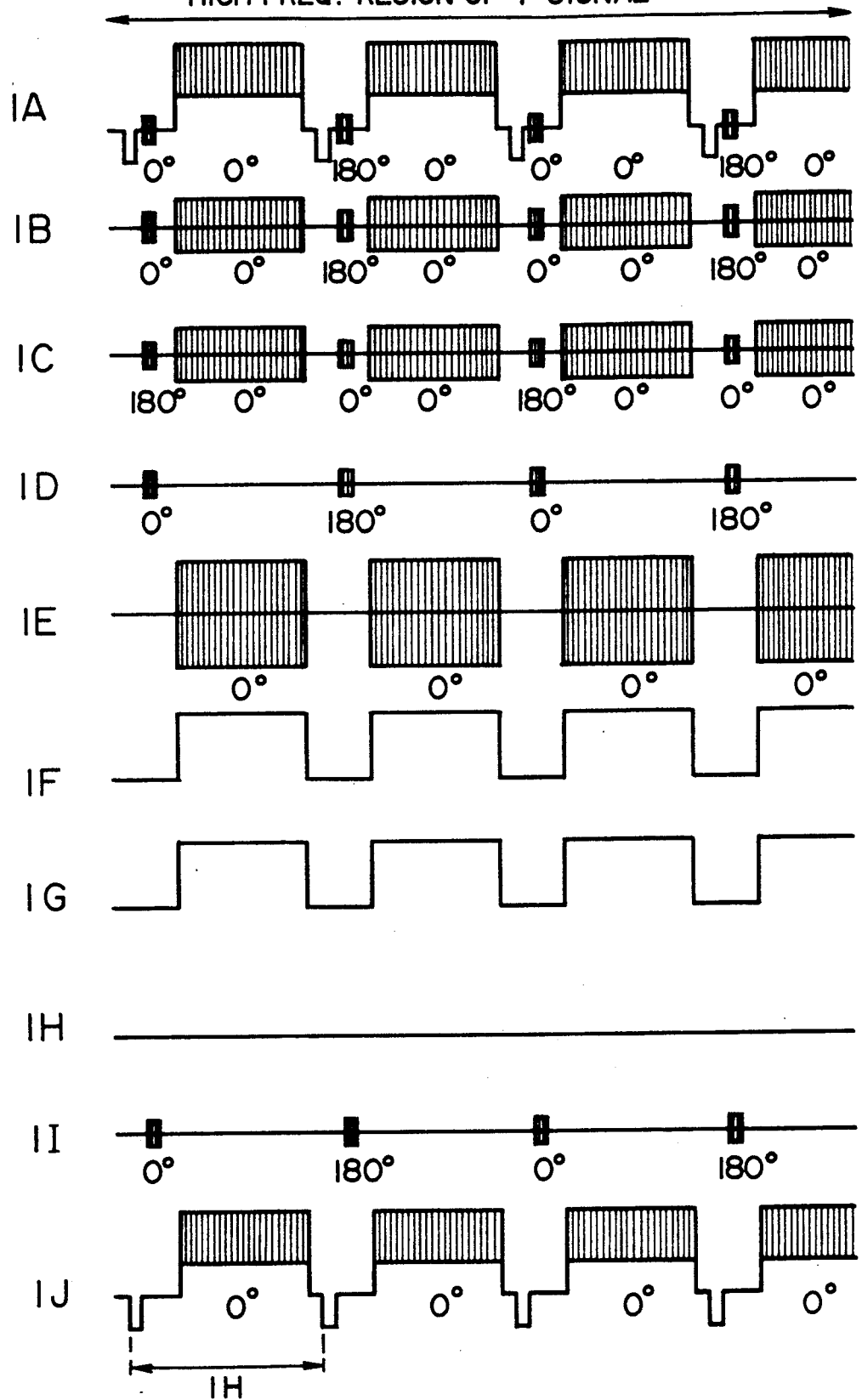

FIGS. 6 and 7 show the waveforms of input and output signals related to the respective blocks of FIG. 4. FIG. 6 shows the waveform of signals bearing a color component in phase with the burst signal and those which changed their states to bear no color components. The characters 1a-1j shown below the corresponding signal waveforms 1A-1J are the phases of starting portions of the respective burst and signal components. In the case of an NTSC signal, the phase of each burst signal is inverted at intervals of 1H. Since the signal portions bear the given color, the signal phase is also inverted at intervals of 1H. In the case of such signals, the signals 1B and 1C are opposite in phase where they bear a given color, the sum of these signals becomes 0 in level and hence the signal 1E. Since the amplitude level of the signal 1E is lower than the predetermined reference level at the converter 5, the output signal 1F from the converter 5 becomes low, so that the output signal 1D from the comb filter is selected. During the time from $t_1$ to $t_2$ in which the signal bearing the given color changes to the signal bearing no color, and when the amplitude level of the output signal 1E from the adder 4 is higher than the predetermined reference level at the converter 5, the output signal 1F from the converter 5 becomes high. When the output signal 1F is high and the output signal 1G from the second delay circuit is low, the selection and determination circuit 9 selects the output signal 1B from the BPF to thereby prevent color spread/blot at color contour on display screen which would otherwise occur when the comb filter output is solely employed. As shown in FIG. 7, when a vertical-stripe signal component in the Y-high frequency region of Y signal was inputted, the signals 1B and 1C are in phase, so that the signal 1E formed of the sum of these signals has twice the amplitude of the signal 1B. Therefore, the output 1F from the converter 5 is high, but the signal 1G having passed through the second delay circuit 6 is also high, so that the selection and determination circuit 9 selects the comb filter output 1D. Thus accurate Y/C separation can be performed at the vertical-stripe signal component in the high frequency region of the Y signal.

As just described above, according to the specific embodiment, when the Y/C signals are separated from the video signal derived through A/D conversion and digitization, one-bit data indicative of the relationship between one signal and another signal comprising a 1H-delayed version of the one signal is delayed by one bit and used for selection of a color signal to thereby detect the state between lines. Furthermore, the capacity of the memory constituting the delay circuits is only required to increase by the length of 1H for one bit. Therefore, this apparatus produces an excellent effect that a small increase in the circuit scale is only required.

A Y/C separating apparatus for a PAL signal and producing effects similar to those produced by the Y/C separating apparatus for an NTSC signal may be constituted by selecting the BPF 2 so as to meet the characteristic of the color band of the PAL signal, and selecting the delay quantity provided by each of the first and second delay circuits 3 and 6 so as to be 2H in the arrangement of FIG. 4.

Figure 8:
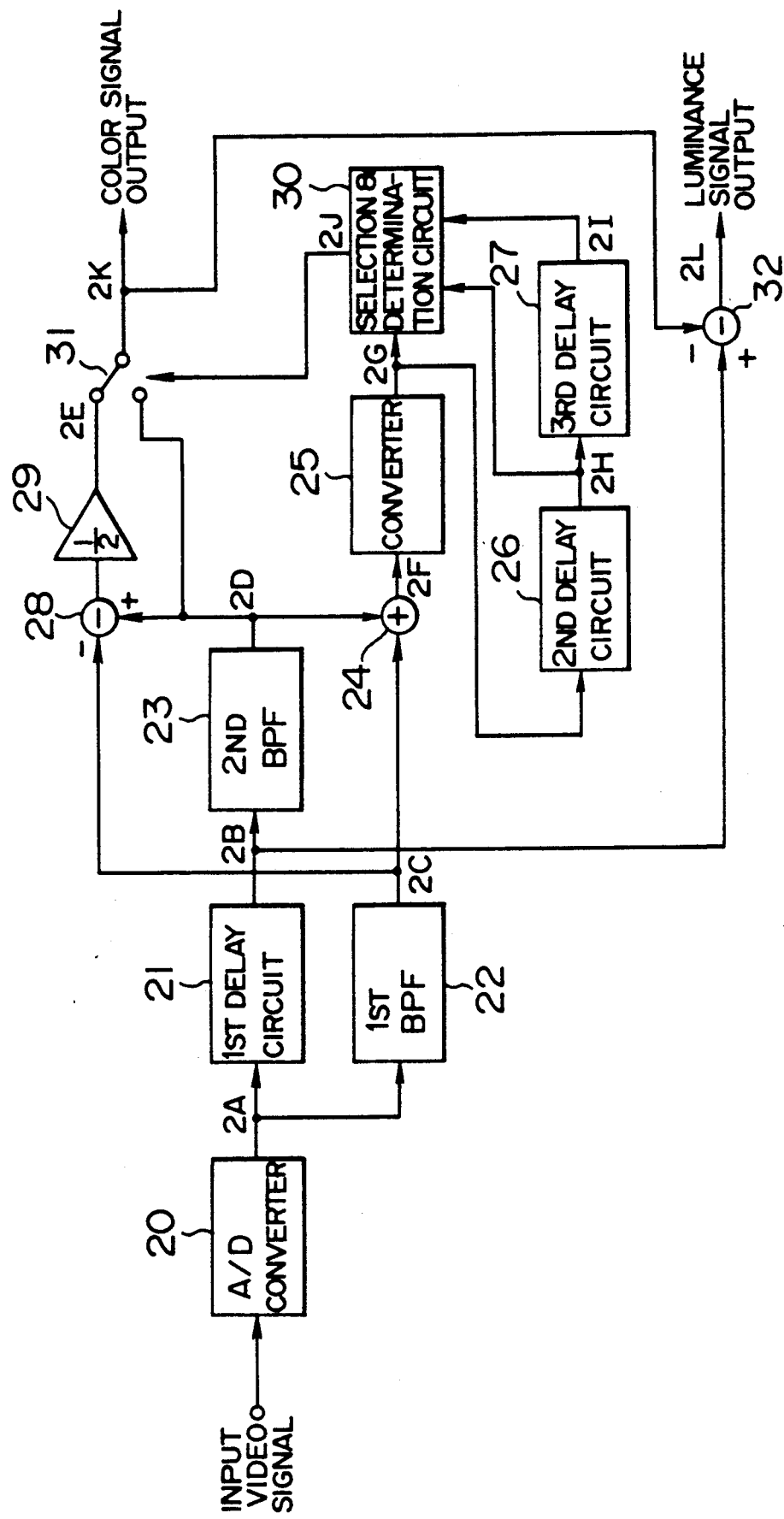
FIG. 8 is a block diagram of a Y/C separating apparatus as a second embodiment of the present invention.

A luminance signal/color signal separating apparatus in a PAL-type VTR will now be described as a second embodiment of the present invention. FIG. 8 is a block diagram of the second embodiment in which reference numeral 20 denotes an analog-to-digital (A/D) converter; 21, a first delay circuit which provides the delay time of 2H; 22, a first band-pass filter (a band-pass filter is hereinafter referred to as a BPF); 23, a second BPF; 24, an adder; 25, a converter; 26, a second delay circuit which provides the delay time of 1H; 27, a third delay circuit which provides the delay time of 1H; 28, a subtractor; 29, a multiplier; 30, a selection and determination circuit; 31, a switching circuit; and 32, a subtractor.

The operation of the above apparatus is described with reference to FIG. 8. An input analog video signal is converted by the A/D converter 20 to a digital video signal 2A, which is then inputted to the first delay circuit 21 and first BPF 22. A video signal 2B comprising a 2H-delayed version of the digital signal from the first delay circuit 21 is inputted to the second BPF 23, the output 2C from the first BPF 22 is subtracted from the output 2D from the second BPF 23 by the subtractor 28, the output from the subtractor 28 is halved by the multiplier 29 to thereby provide the comb filter output 2E. The outputs 2C and 2D from the first and second BPFs 22 and 23 are added by the adder 24, the output 2F from which is converted by the converter 25 to a signal 2G (states L and H) indicative of the correlation between 2C and 2D.

FIG. 9 shows the internal arrangement of the converter 25. Namely, it includes an absolute value circuit 62, a one-clock delay circuit 63, an adder 64, and a comparator 65. The output 2F from the adder 24 is changed by the absolute value circuit 62 to its absolute value, which is then added by the adder 64 to a one-clock delayed version of the output from the absolute value circuit 62 and provided by the delay circuit 63 such that the absolute amplitude value is averaged. The output from I1 from the adder 64 is compared with a predetermined reference value KA by the comparator 65. If the magnitude of the signal I1 is less than the reference value KA, the output from the comparator 65 becomes low while if the magnitude of the signal I1 is greater than the reference value KA, the output from the comparator 65 becomes high. The output from the comparator 65 is used as the output 2G from the converter 25, which is then inputted to and delayed by 1H by the second delay circuit 26. The output from the second delay circuit 26 is inputted to and delayed by 1H by the third delay circuit 27. The output 2G from the converter 25, the output 2H from the second delay circuit 26 and the output 2I from the third delay circuit 27 are inputted to the selection and determination circuit 30, which determines which of the comb filter output and the BPF output should e selected as the color signal output. FIG. 9 shows the internal arrangement of the selection and determination circuit. Namely, it includes a 3-inputs NAND gate 66 and an AND gate 67. When the output 2G from the converter 25 is low (there is a small change between outputs 2D and 2C), the selection and determination circuit 30 determines that there is no change between the signals 2C and 2D to thereby output the comb filter output 2E as the color signal. If the output 2G from the converter 25 is high (there is a large change between 2D and 2C) and the output 2I from the third delay circuit 27 is low (there is a small change between signals 2D and 2C preceding by 2H), the circuit 30 determines that there is a change between 2D and 2C and provides the output 2D from the second BPF as the color signal. When the output 2G from the converter 25 is high, and when the output 2I from the third delay circuit 27 is high and when the output 2H from the second delay circuit 26 is low, the circuit 30 determines that the signal 2D is different from those signals on the just precedent line and subsequent line of the signal 2D line and provides the output 2D from the second BPF 23 as the color signal. When the output 2G from the converter 25 is high, when the output 2I from the third delay circuit 27 is high and when the output 2H from the second delay circuit 26 is high, the circuit 30 determines that there is contained a high-frequency region component of the Y signal and selects to provide the comb filter output 2E as the color signal. The luminance signal is obtained by subtracting the color signal output 2K from the output 2B from the first delay circuit 21 in the subtractor 32.

Figure 10:
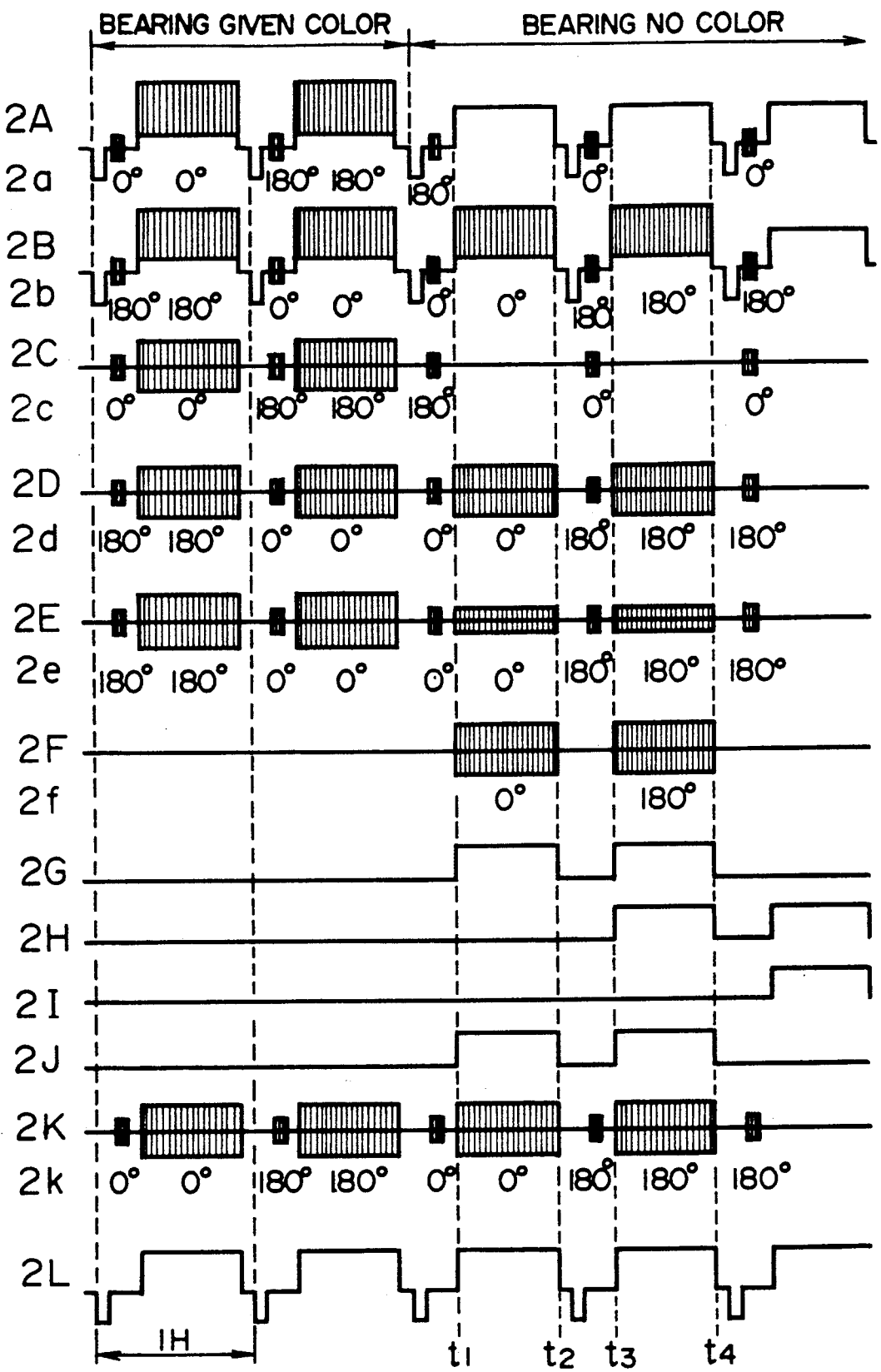
FIGS. 10-12 show waveforms of input and output signals related to the respective blocks of FIG. 8.
Figure 11:
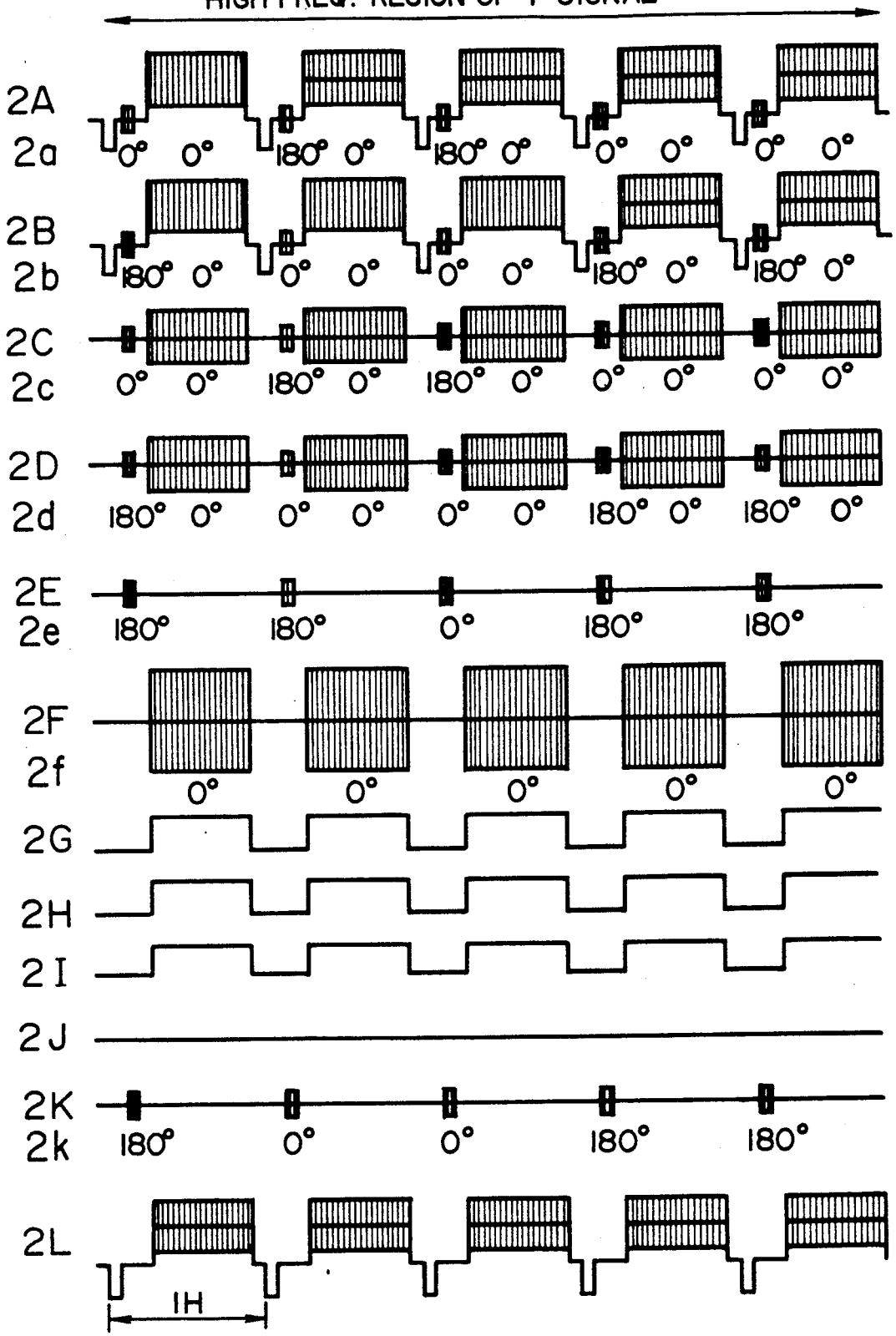
Figure 12:
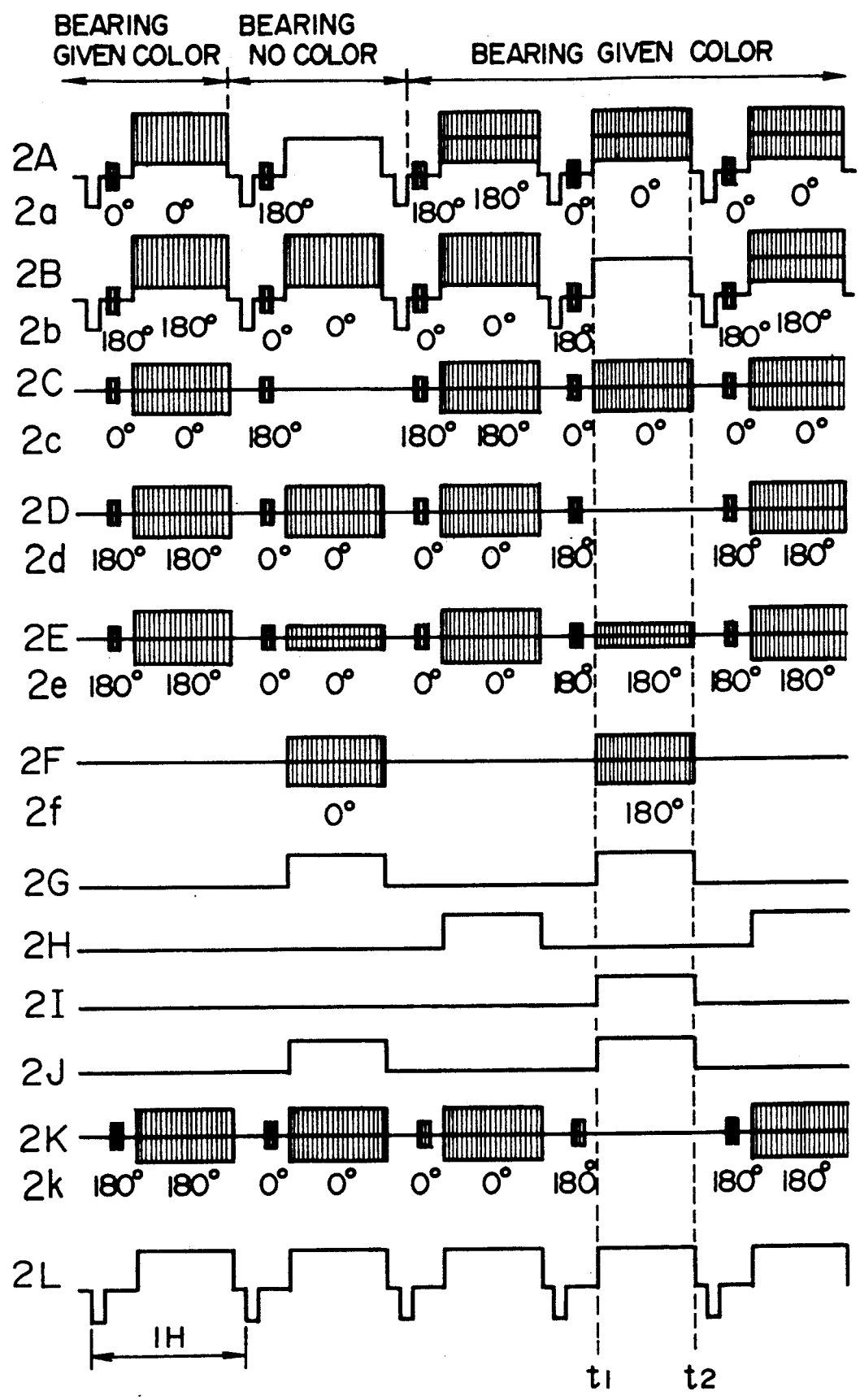

FIGS. 10, 11 and 12 show the waveforms of input and output signals related to the respective blocks of FIG. 8. FIG. 10 shows the waveforms of signals in which bearing a color component and those bearing no color components. The characters 2a-2k shown below the corresponding signal waveforms 2A-2K show the phases of starting portions of the respective burst and signal components. In the case of a PAL signal, the phase of each burst signal is inverted at intervals of 2H. Since the signal portions bear a given color, their phases are also inverted at intervals of 2H. In the case of such signals, the signals 2D and 2C are opposite in phase during the period when the signals bear the given color, so that the sum of these signals in the adder 24 becomes zero level and hence the signal 2F. The amplitude level of the signal 2F is lower than a predetermined reference level at the converter 25, so that the output signal 2G from the converter 25 becomes low and the comb filter output signal 2E is selected. During the times $t_1-t_2$ and $t_3-t_4$ when the signals bearing the given color change to the signals bearing no colors, and when the amplitude level of the output signal 2F from the adder 24 is higher than the predetermined reference level in the converter 25, the output signal 2G from the converter 25 becomes high. In addition, when the output signal 2I from third delay circuit is low, the selection and determination circuit 30 selects the BPF output signal 2D. This prevents color spread/blot at color contour on display screen which would otherwise occur when the comb filter output is solely selected. As shown in FIG. 11, when a vertical-stripe signal component in the high-frequency region of the Y signal was inputted, the signals 2D and 2C are in phase, so that the signal 2F indicative of the sum of these signals in the adder 24 has twice the amplitude level of the signal 2D. Thus the output 2G from the converter 25 becomes high. However, since the output signals 2H and 2I from the second and third delay circuit 26 and 27 are also high, the circuit 30 selects to output the comb filter output 2E. Thus accurate Y/C separation can be also performed at the vertical-stripe signal component of the high frequency region of the Y signal. As shown in FIG. 12, if there is only one particular line bearing no color and lines around that particular line bear colors, that particular line can be determined as different from other lines since the output signal 2H from the second delay circuit 26 is low even if the output signal 2G from the converter 25 is high and even if the output signal 2I from the third delay circuit 27 is high during the time $t_1-t_2$. Thus the circuit 30 selects the BPF output signal 2D to thereby perform accurate Y/C separation.

As just described above, according to the above embodiment, when the Y/C signals are separated from a PAL video signal derived through A/D conversion and digitization, one-bit data indicative of the relationship between a given signal and another signal comprising a 2H-delayed version is delayed by 2H to thereby detect the state between lines for selection of a color signal. Furthermore, the capacity of the memory constituting the delay circuits is only required to increase by a length of 2H for one bit. Therefore, this apparatus produces an excellent effect that a small increase in the circuit scale is only required.

Figure 13:
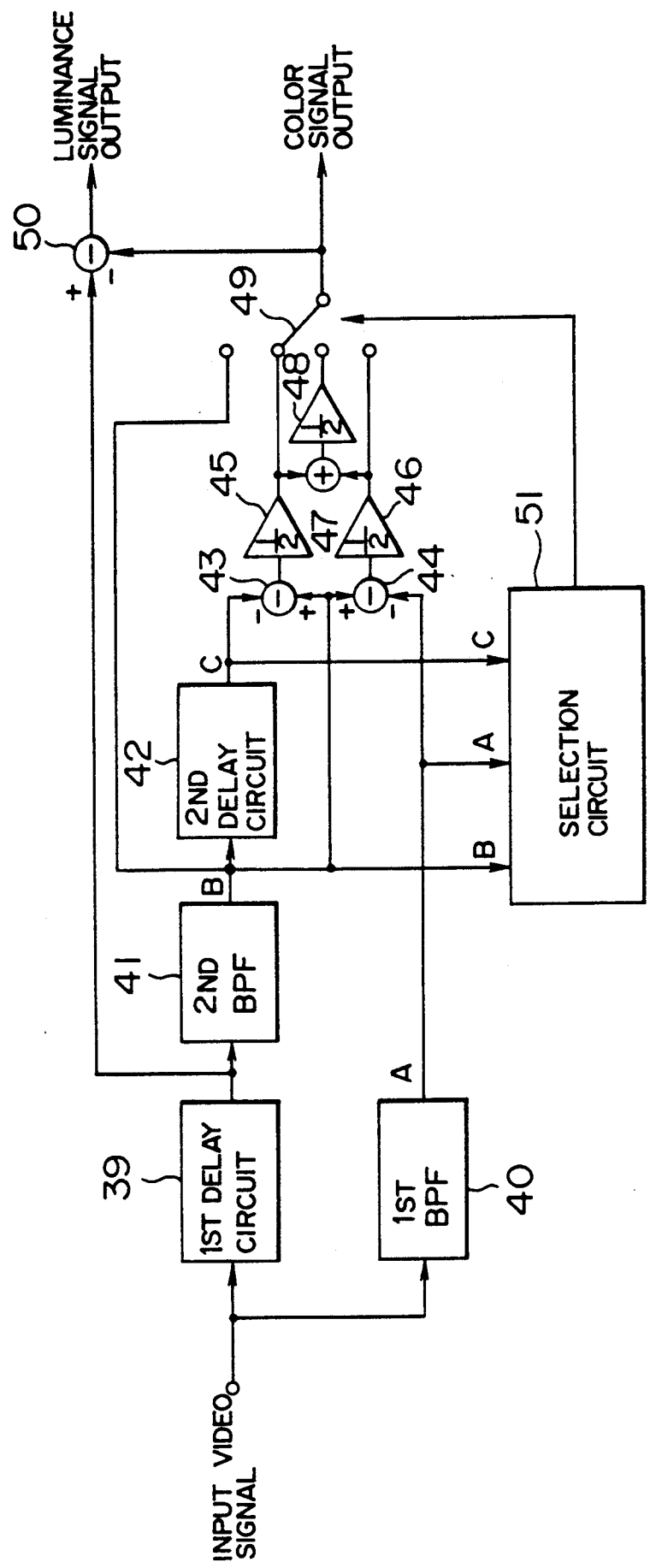
FIG. 13 is a block diagram of a Y/C separating apparatus as a third embodiment of the present invention.

A video signal separating apparatus for an NTSC signal as a third embodiment of the present invention will now be described. In FIG. 13, which shows a block diagram of the Y/C separating apparatus, reference numeral 39 denotes a first delay circuit which provides a delay of one horizontal period; 40, a first band-pass filter which passes a color signal band; 41, a second band-pass filter having the same characteristic as the first band pass filter (a band-pass filter is hereinafter referred to as a BPF) 40; 42, a second delay circuit which provides a delay of one horizontal period; 43, 44, 47 and 50, arithmetic circuits; 45, 46 and 48, a multiplier with a factor of ½; 51, a selector; and 49, a switching circuit.

The operation of thus constituted apparatus is described with reference to FIG. 13. The first BPF 40 receives a video signal and outputs a signal A of the color signal band component separated from the video signal. The video signal is also delayed by one horizontal period by the first delay circuit 39, the output from which is inputted to the second BPF 41. The BPF 41 then outputs a signal B of the separated color signal band component, which is then delayed by one horizontal period in the second delay circuit 42. The output signal C from the second delay circuit 42 is subtracted from the signal B in the calculating circuit 43, and the resulting output is multiplied by a factor of ½ in the multiplier 45, the output from which becomes B/2-C/2. The calculating circuit 44 subtracts the signal A from the signal B and the resulting output is multiplied by a factor ½ in the multiplier 46, the output from which becomes B/2-A/2. The calculating circuit 47 adds the outputs from the multipliers 45 and 46, and the resulting output is multiplied by a factor of ½ in the multiplier 48, the output from which becomes B/2-A/4-C/4. The outputs from the multipliers 45, 46, 48 and the signal B are inputted to the switching circuit 49. The signals A, B and C are inputted to the selection circuit 51, which outputs to the switching circuit 49 a control signal to determine which of the four signals B, B/2-A/2, B/2-C/2, B/2-A/4-C/4 should be selected as the color signal in accordance with the signals A, B and C. The switching circuit 49 outputs one of the outputs from the multipliers 45, 46 and 48 as the color signal in accordance with the control signal from the selector 51. The calculating circuit 50 outputs a luminance signal obtained by subtracting the color signal output of the switching circuit 49 from the output of the first delay circuit 39.

Figure 14:
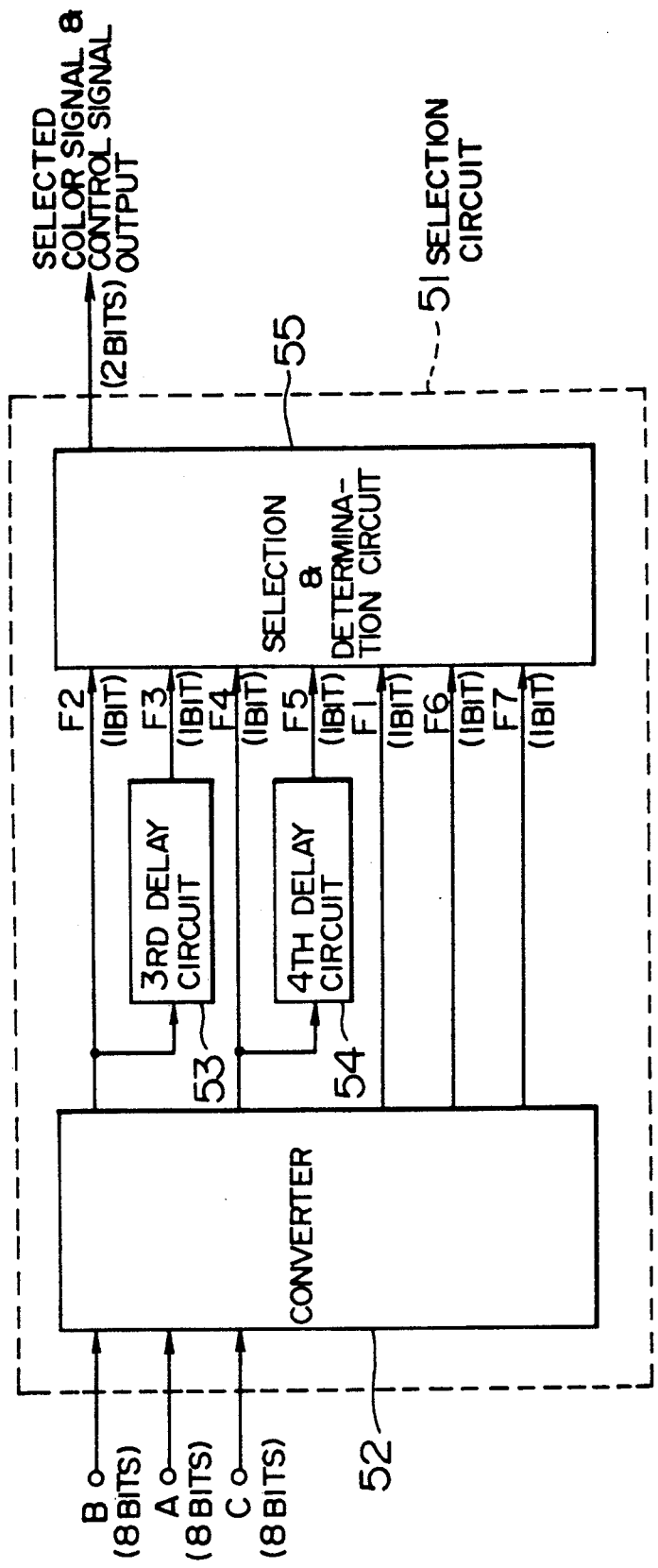
FIG. 14 is a block diagram of the essential portion of a selector of the apparatus of FIG. 13.
Figure 15:
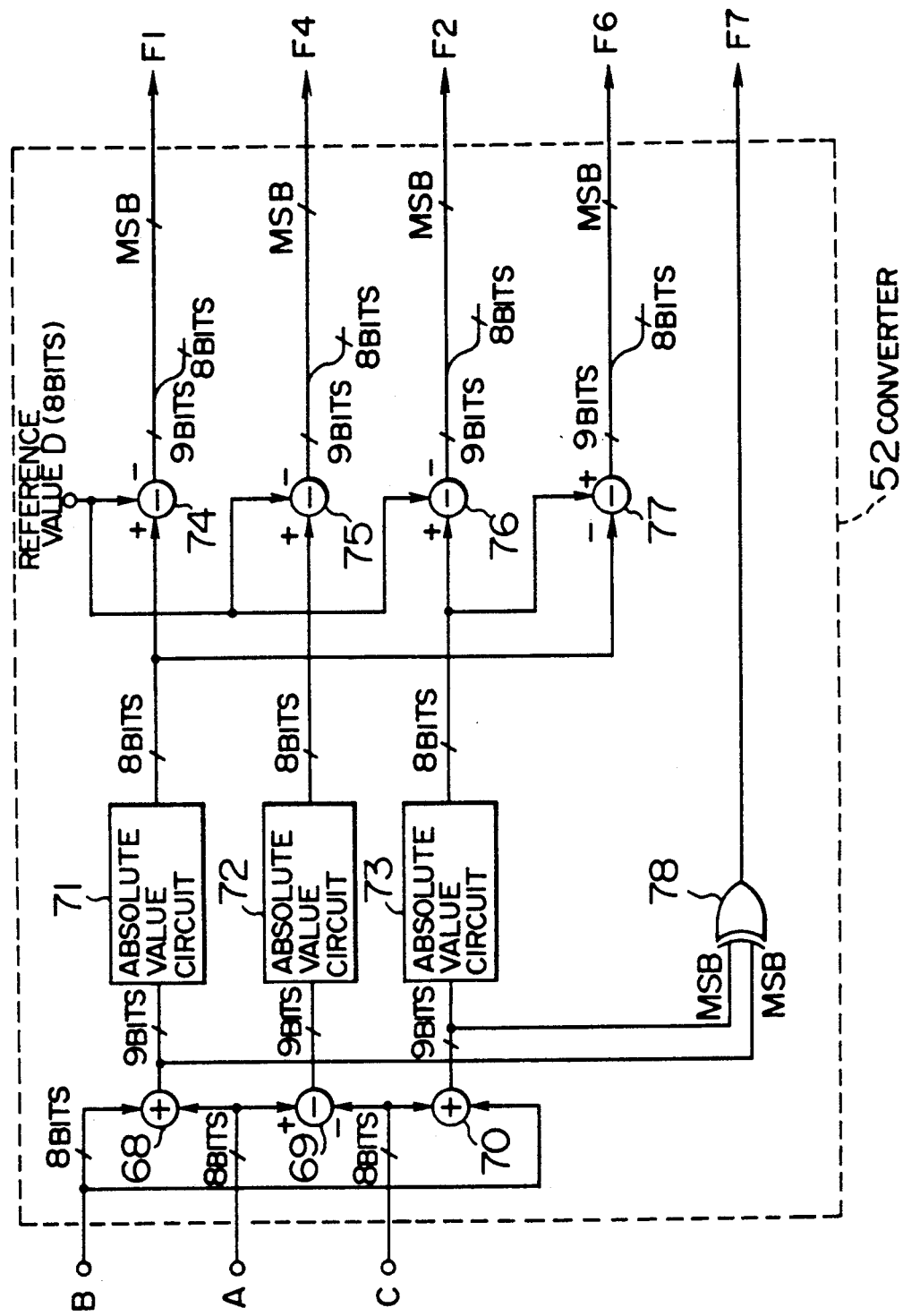
FIG. 15 is a circuit diagram of the essential portion of a converter of the apparatus of FIG. 13.

As shown in FIG. 14, the selection circuit 51 includes a converter 52, a third delay circuit 53, a fourth delay circuit 54 and a selection and determination circuit 55. The converter 52, as shown in FIG. 15, includes adders 68, 70; subtractors 69, 74, 75, 76, 77; absolute value circuits 71, 72, 73; and an EX-OR gate 78. The converter 52 receives signals A, B, C and has a predetermined reference level D. The adder 68 calculates the sum of the signals B and A, the absolute value circuit 71 calculates the absolute value of the signal B +A, and the subtractor 74 calculates (the absolute value of B+A)−D. The most significant bit (MSB) of subtractor 74 output represents a sign. If the sign is positive, the MSB is low while if the sign is negative, the MSB is high. The most significant bit of the output from the subtractor 74 is outputted as a control signal F1. The adder 70 calculates the sum of the signals B and C, the absolute value circuit 73 calculates the absolute value of the signal B+C, and the subtractor 76 calculates (the absolute value of B+C)−D. The MSB indicative of the sign of the output from the subtractor 76 is outputted as a control signal F2. The subtractor 69 calculates the difference A−C, the absolute value circuit 72 calculates the absolute value of the A−C, and the subtractor 75 calculates (the absolute value A−C)−D. The MSB indicative of the sign of the output from the subtractor 75 is outputted as a control signal F4. The subtractor 77 subtracts the output of the absolute value circuit 71 (the absolute value of the signal B+A) from the output of the absolute value circuit 73 (the absolute value of the signal B+C). The MSB indicative of the output sign of the subtractor 77 is outputted as a control signal F6. The MSBs indicative of the outputs from the adders 68 and 70 are inputted to the EX-0R gate 78, which provides its output as a control signal F7.

Figure 16:
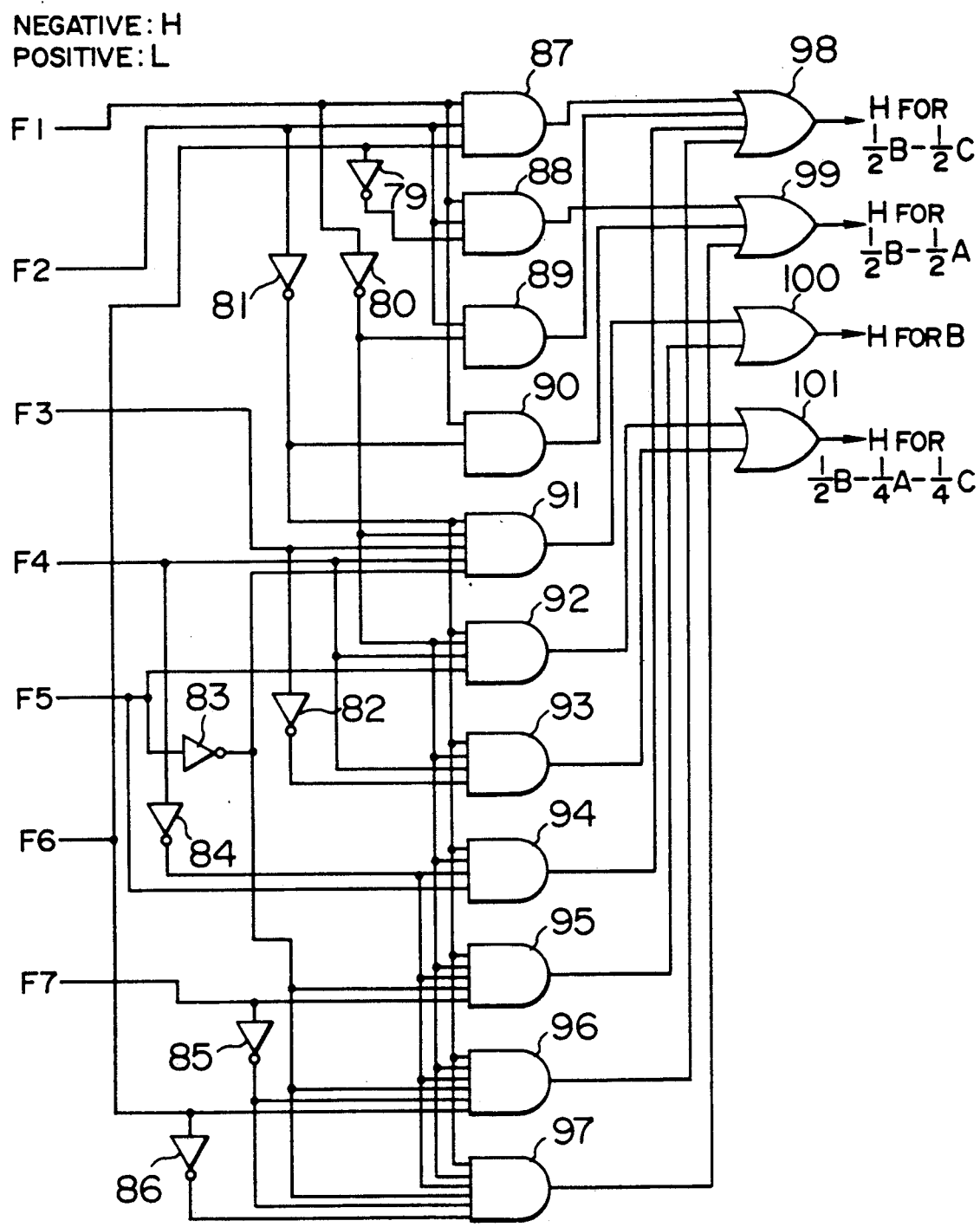
FIG. 16 is a circuit diagram of the essential portion of a selection and determination circuit of the apparatus of FIG. 13.

The control signals F1, F2, F4, F6 and F7 outputted from the converter 52 are inputted to the selection and determination circuit 55. The control signal F2 is delayed by one horizontal period by the third delay circuit 53, the output (F3) of which is inputted to the circuit 55. The control signal F4 is delayed by one horizontal period by the fourth delay circuit 54, the output (F5) of which is inputted to the circuit 55. The circuit 55 comprises a logical circuit which selects as the color signal one of the signals B, B/2−C/2, B/2−A/2, and B/2−A/4−C/4 in accordance with the control signals F1−F7. FIG. 16 shows the specific arrangement of the circuit 55. Namely, it includes inverters 79−86, AND gates 87−97, and OR gates 98-101. The circuit arrangement of FIG. 16 satisfies a logical table below in which NE and PO indicate negative and positive signs, respectively.

TABLE

| F1 | F2 | F3 | F4 | F5 | F6 | F7 | SELECTED OUTPUTS |
|---|---|---|---|---|---|---|---|
| NE | NE |  |  |  | NE |  | B/2-C/2 |
| NE | NE |  |  |  | PO |  | B/2-A/2 |
| PO | NE |  |  |  |  |  | B/2-C/2 |
| NE | PO |  |  |  |  |  | B/2-A/2 |
| PO | PO | NE | NE | PO |  |  | B |
| PO | PO |  | NE | NE |  |  | B/2-A/4-C/4 |
| PO | PO | PO | NE |  |  |  | B/2-A/4-C/4 |
| PO | PO |  | PO | NE |  |  | B/2-C/2 |
| PO | PO |  | PO | PO |  | NE | B |
| PO | PO |  | PO | PO | NE | PO | B/2-C/2 |
| PO | PO |  | PO | PO | PO | PO | B/2-A/2 |

Figure 17:
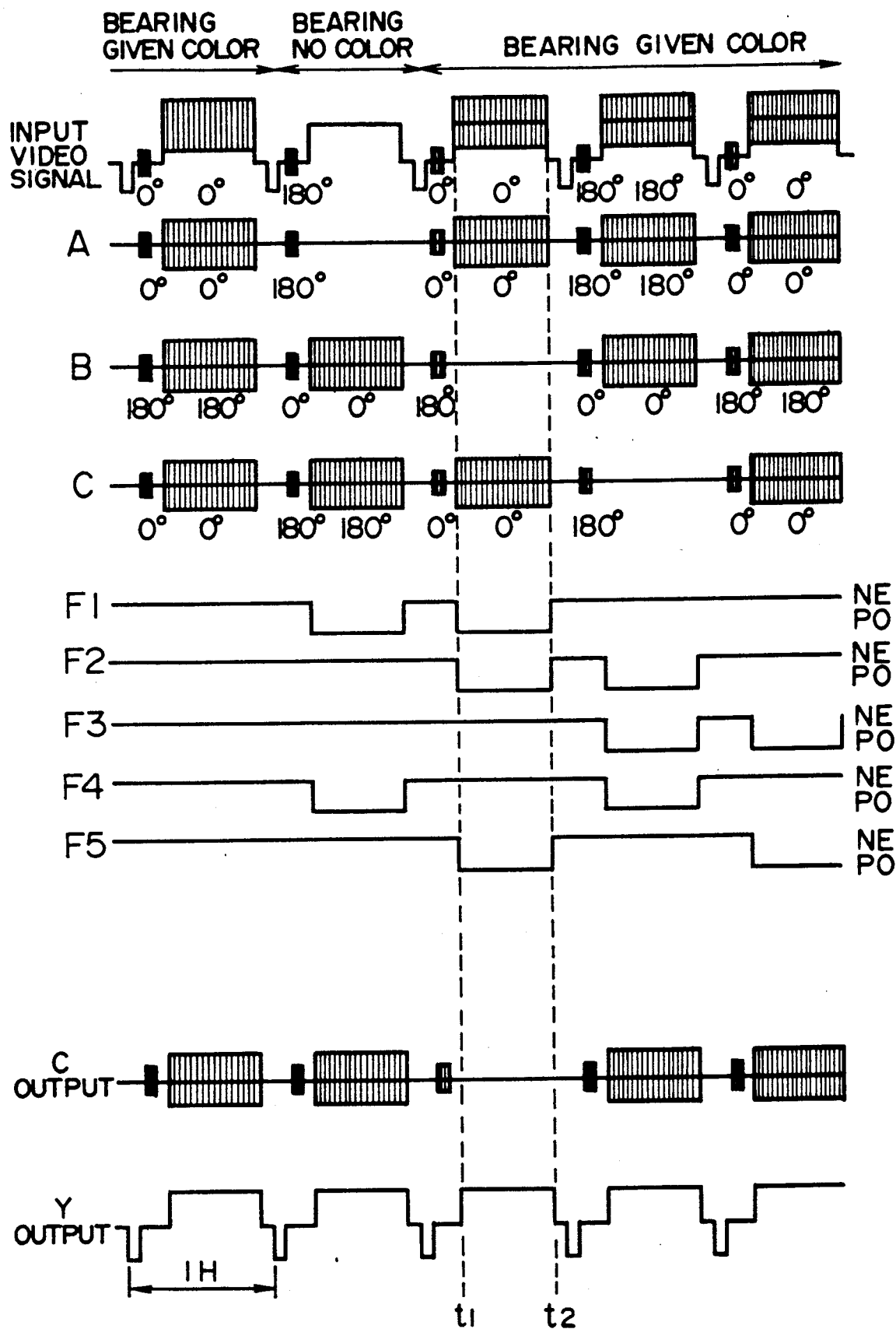
FIGS. 17 and 18 show waveforms of input and output signals related to the respective blocks of FIG. 13.
Figure 18:
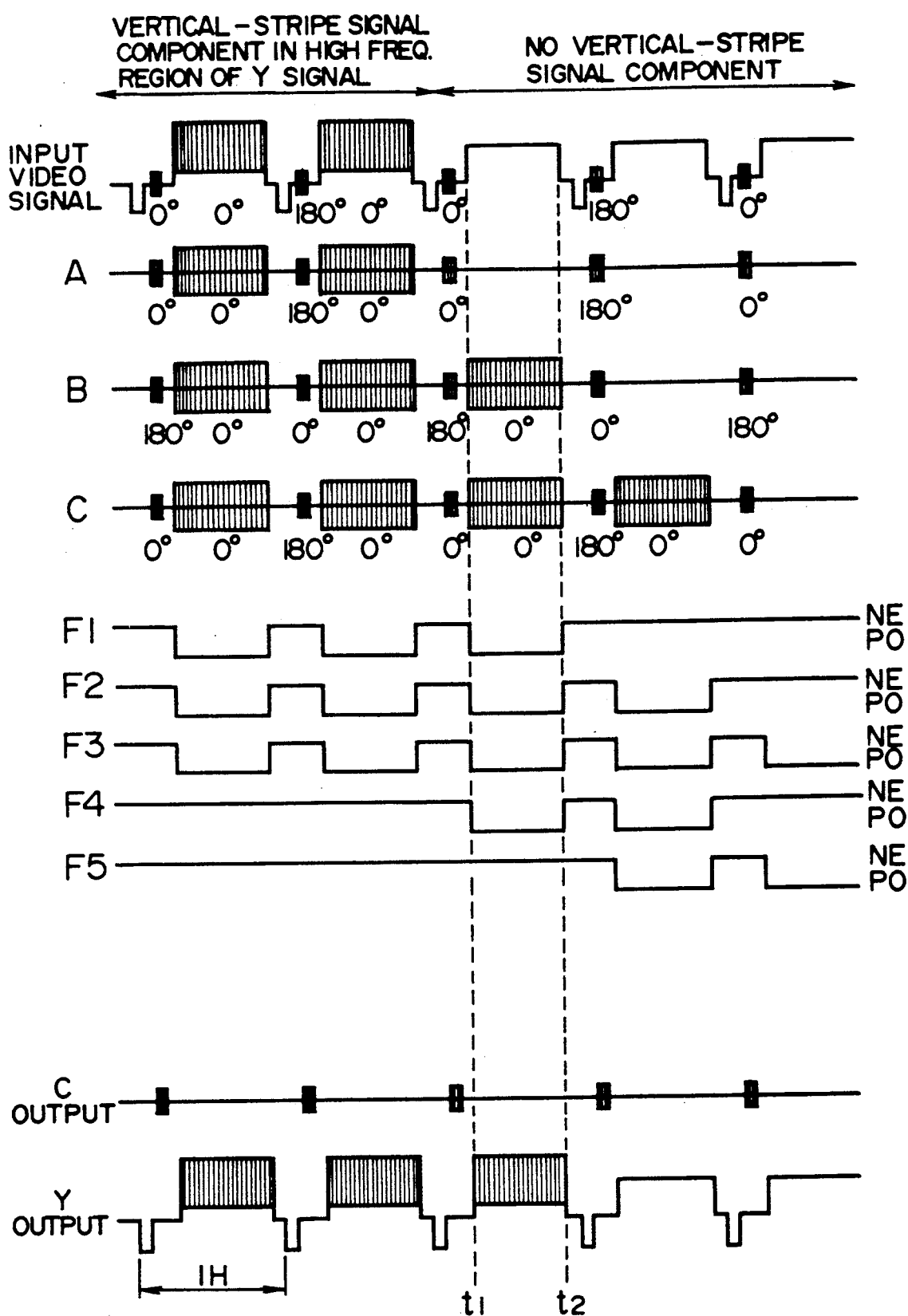

FIGS. 17 and 18 show the waveforms of the input and output signals related to the respective blocks of FIGS. 13 and 14. If there is only one particular line bearing no color component among lines bearing a given color component, it is possible to identify that the particular line is different in content from the other lines by checking the conditions F1-F5. During the time $t_1$-$t_2$, only the signal B bears no color component and other signals bear color components. It is identified that only the signal B is different from the signals on other lines from the conditions that the signal F1 indicative the relationship between the signals B and A is positive (there is a large change between the signals B and A), that the signal F2 indicative the relationship between the signals B and C is positive (there is a large change between the signals B and C), that the signal F3 indicative of the relationship between the signals C and D is negative where the signal D comprises a 1H-delayed version of the signal C (there is a small change between C and D), that the signal F4 indicative the relationship between A and C is negative (there is a small change between A and C), and that the signal F5 indicative of the relationship between B and C is positive (there is a large change between B and D). Therefore, B is selected as a color signal output.

As shown in the lower part of FIG. 18, it is possible to accurately determine the signal portion (for the time interval $t_1$-$t_2$) switching from including the high-frequency region component of the Y signal to not including such component of the Y signal. It is possible to determine that there is a vertical-stripe component in the high-frequency region of the Y signal between the signals B and D where D comprises a 1H-delayed version of C and that A is different from the signals B, C and D from the conditions that F1 indicative of the relationship between B and A is positive (there is a large change between B and A), that F2 indicative of the relationship between B and C is positive (there is a large change between B and C), that F4 indicative of the relationship between A and C is positive (there is a large change between A and C), and that F5 indicative of the relationship between B and D is positive (there is a large change between B and D). Thus B/2–C/2 is selected and outputted as the color signal.

As described above, by checking the relationship between signals D and B and the relation between D and C, a more detailed analysis of the signals is possible to thereby provide correct selection.

As described above, according to the particular embodiment, the selector creates seven data segments each indicative of the relationship between any particular ones of the present signal to be processed, a signal preceding the present signal by 1H, a signal preceding the current signal by 2H and a signal lagging behind the present signal by 1H, and selects a color signal output in accordance with the respective contents of the seven data segments, so that accurate adaptive Y/C separating apparatus is implemented. For the signal preceding the present signal by 2H, only data indicative of the relationship between lines is delayed, so that only a small increase in the memory capacity is required advantageously.

As described above, according to the present invention, in separating Y and C signals from a video signal, n (n is an integer)-bid data indicative of the relationship between a signal and a delayed version of that signal is delayed by m (m is an integer) horizontal periods to be used for selection of a color signal. Thus, it is possible to accurately detect the state between lines to thereby separate Y and C signals accurately. In addition, the capacity of the memory constituting the delay circuits is only required to increase by a length of m horizontal periods for n bits, so that only a small increase in the circuit scale is required advantageously.

I claim:
1. A video signal separating apparatus comprising:
   an analog-to-digital converter for converting a video signal to a digital video signal;
   a band-pass filter for passing a color signal band of the digital video signal;
   a first delay circuit for delaying a first color signal passed from the filter by n horizontal periods where n is an integer;
   a first calculating circuit for calculating out the sum of the first color signal and a delayed version of the first color signal outputted from the first delay circuit to thereby calculate out the difference between these signals;
   a converter for converting the output from the first calculating circuit to a correlation value;
   a second delay circuit for delaying the correlation value outputted from the converter by m horizontal periods where m is an integer;
   a second calculating circuit for calculating to halve the difference between the first color signal and a delayed version of the first color signal from the first delay circuit;
   a switching circuit for outputting either one of a second color signal output from the second calculating circuit and the first color signal; and a selection and determination circuit for determining which of the first and second color signals should be selected as the output from the switching circuit in accordance with the correlation values output from the converter and the second delay circuit, whereby the signal from the switching circuit is used as a third color signal to be outputted as an output color signal, and the third color signal is then subtracted from the video signal to produce an output luminance signal.

2. A video signal separating apparatus according to claim 1, wherein the delay length of the first delay circuit is one horizontal interval, the delay length of the second delay circuit is one horizontal interval, the converter outputs two correlation values, one indicative of the presence of the correlation and the other indicative of the absence of the correlation, the selection and determination circuit selects the second color signal when the output from the converter indicates the presence of the correlation, or when the output from the converter indicates the absence of the correlation and when the output from the second delay circuit indicates the absence of the correlation, and selects the first color signal when the output from the converter indicates absence of the correlation and when the output from the second delay circuit indicates the presence of the correlation.

3. A video signal separating apparatus according to claim 1, wherein the delay length of the first delay circuit is two horizontal intervals, the delay length of the second delay circuit is two horizontal periods, the converter outputs two correlation values, one indicative of the presence of the correlation and the other indicative of the absence of the correlation, the selection and determination circuit selects the second color signal when the output from the converter indicates the presence of the correlation, or when the output from the converter indicates the absence of the correlation and when the output from the second delay circuit indicates the absence of the correlation, and selects the first color signal when the output from the converter indicates absence of the correlation and when the output from the second delay circuit indicates the presence of the correlation.

4. A video signal separating apparatus comprising:
an analog-to-digital converter for converting an input analog video signal to a digital video signal;
a first delay circuit for delaying the digital video signal by n horizontal periods where n is a positive integer;
a first band-pass filter for receiving the digital video signal and passing a color signal band component of the digital video signal;
a second band-pass filter for receiving the digital video signal from the first delay circuit and passing a color signal band component of the digital video signal;
a first calculating circuit for calculating the sum of the output signals from the first and second band-pass filters;
a converter for converting the sum output from the first calculating circuit to a correlation value of a predetermined kind in accordance with the level of the sum output;
a second delay circuit for delaying the correlation value outputted from the converter by m horizontal periods where m is a positive integer;

a third delay circuit for delaying the correlation value outputted from the second delay circuit by l (l is a positive integer) horizontal periods;
a second calculating circuit for subtracting the output signal of the first band-pass filter from the output signal of the second band-pass filter;
a third calculating circuit for multiplying the output from the second calculating circuit by a factor of ½;
a switching circuit for selectively outputting either one of the output signal from the third calculating circuit and the output signal from the second band-pass filter in accordance with a selection signal;
a selection and determination circuit for receiving the correlation values outputted from the converter and the second and third delay circuits and outputting the selection signal to the switching circuit; and
a fourth calculating circuit for subtracting the output signal of the switching circuit from the output video signal of the first delay circuit, whereby the switching circuit outputs a color signal and the fourth calculating circuit outputs a luminance signal.

5. A video separating apparatus according to claim 4, wherein the first delay circuit provides a delay of two horizontal periods, each of the second and third delay circuits provides a delay of one horizontal interval, the correlation value output from the converter comprises a binary signal indicative of the presence and absence of the correlation depending on whether the correlation value is higher than a predetermined level or not, the selection and determination circuit supplies to the switching circuit a selection signal to select and output the output signal from the third calculating circuit when the output from the converter is a signal indicative of the presence of the correlation, or when the output from the converter indicates the absence of the correlation, when the output from the second delay circuit is a signal indicative of the absence of the correlation, and when the output from the third delay circuit is a signal indicative of the absence of the correlation; and the selection and determination circuit supplies to the switching circuit a selection signal to select and output the output signal from the second band-pass filter when the output from the converter is a signal indicative of the absence of the correlation and when the output from the third delay circuit is a signal indicative of the presence of the correlation or when the output from the converter is a signal indicative of the absence of the correlation and when the output from the second delay circuit is a signal indicative of the presence of the correlation.

6. In a system for selecting from at least three color output signals in order to adaptively separate a luminance signal and a color signal from a video signal, a separating apparatus including a color signal selection circuit comprising:
a converter for converting to a correlation value a relationship among at least three input video signals spaced from each other by n horizontal periods and passed through a color-band-pass filter;
a delay circuit for delaying the correlation value output from the converter by n horizontal periods where n is an integer and providing a delayed output every one horizontal period; and
a selection and determination circuit for selecting at least one correlation value outputted from the delay circuit and a color signal from the at least three input video signals and outputting a control signal in accordance with the result of the selection.

7. A video signal separating apparatus according to claim 6, wherein the number of the input video signals inputted to the selection circuit is three and all of the three video signals are the ones which have passed through a color-band-pass filter, in which the first signal is a signal to be processed at present, the second signal is a signal preceding to the first signal by one horizontal period, the third signal is a signal lagging behind the first signal by one horizontal period, and the delay length of the delay circuit is one horizontal period.

* * * * *